United States Patent
Gloeckner et al.

(10) Patent No.: US 7,135,522 B2
(45) Date of Patent: Nov. 14, 2006

(54) DISPERSIONS OF AMORPHOUS URETHANIZED UNSATURATED POLYESTER RESINS BASED ON PARTICULAR DICIDOL ISOMERS

(75) Inventors: Patrick Gloeckner, Ratingen (DE); Lutz Mindach, Marl (DE); Martina Ortelt, Duelmen (DE)

(73) Assignee: Degussa AG, Duesseldorf (DE)

( * ) Notice: Subject to any disclaimer, the term of this patent is extended or adjusted under 35 U.S.C. 154(b) by 331 days.

(21) Appl. No.: 10/743,480

(22) Filed: Dec. 23, 2003

(65) Prior Publication Data

US 2004/0138375 A1   Jul. 15, 2004

(30) Foreign Application Priority Data

Dec. 24, 2002  (DE) .............................. 102 61 005

(51) Int. Cl.
*C08J 3/00* (2006.01)
*C08K 3/20* (2006.01)
*C08L 75/00* (2006.01)
*C08F 8/30* (2006.01)
*C08F 283/04* (2006.01)

(52) U.S. Cl. ................. 524/591; 524/507; 524/539; 524/589; 524/590; 524/839; 524/840; 525/123; 525/127; 525/131; 525/440; 525/453; 525/454

(58) Field of Classification Search ................ 524/507, 524/539, 589, 590, 591, 839, 840; 525/123, 525/127, 131, 440, 453, 454
See application file for complete search history.

(56) References Cited

U.S. PATENT DOCUMENTS

| 4,307,002 | A | * | 12/1981 | Wagner et al. | ................. 527/7 |
| 4,478,994 | A | * | 10/1984 | Doerffel et al. | ............. 528/304 |
| 5,648,410 | A |   | 7/1997 | Hille et al. | |
| 5,712,035 | A | * | 1/1998 | Ohtaka et al. | ............. 428/378 |
| 6,143,841 | A | * | 11/2000 | Spittka et al. | ............. 525/444 |
| 6,277,910 | B1 | * | 8/2001 | Rassing et al. | ............. 524/501 |
| 6,930,155 | B1 | * | 8/2005 | Weiss et al. | ................. 525/424 |
| 6,960,620 | B1 | * | 11/2005 | Wenning et al. | ............. 522/93 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

An aqueous dispersion, contains: a) an amorphous urethanized, unsaturated polyester resin, b) a nonvolatile content of from 20% to 60% by weight, c) from 0 to 60% by weight of a solvent, d) a pH of between 5.0 and 9.5, and e) a viscosity at 20° C. of from 20 to 500 mPas. The polyester resin is obtained from I. an alcohol component, II. i) from 20 to 100 mol % of an α,β-unsaturated carboxylic acid component, and ii) from 0 to 80 mol % of a further carboxylic acid component, and III. at least one isocyanate component. The alcohol component contains a dicidol mixture of the isomeric compounds 3,8-bis(hydroxymethyl)tricyclo[$5.2.1.0^{2,6}$]decane, 4,8-bis(hydroxymethyl)tricyclo[$5.2.1.0^{2,6}$]decane and 5,8-bis(hydroxymethyl)tricyclo[$5.2.1.0^{2,6}$]decane. Each isomer is present in a fraction of from 20 to 40% in the dicidol mixture. The sum of the three isomers in the dicidol mixture is from 90 to 100%. The dicidol mixture is present from 10 to 100 mol % in the alcohol component of the polyester.

37 Claims, No Drawings

DISPERSIONS OF AMORPHOUS URETHANIZED UNSATURATED POLYESTER RESINS BASED ON PARTICULAR DICIDOL ISOMERS

BACKGROUND OF THE INVENTION

1. Field of the Invention

The present invention relates to a dispersion of an amorphous urethanized unsaturated polyester resin based on particular dicidol isomers and acids.

2. Discussion of the Background

Unsaturated polyester resins (UP resins) are known. They are prepared by condensing saturated and unsaturated dicarboxylic acids or their anhydrides with diols. Their properties depend largely on the nature and proportion of the starting materials.

As carriers of the polymerizable double bonds it is usual to use $\alpha,\beta$-unsaturated acids, primarily maleic acid or its anhydride or fumaric acid; unsaturated diols are of minor importance. The higher the double bond content, i.e., the shorter the distance between the double bonds in the chain molecules, the more reactive the polyester resin. It polymerizes very rapidly, evolving large quantities of heat and undergoing a high level of volume contraction, to form a highly crosslinked and therefore relatively brittle end product. Consequently the reactive double bonds in the polyester molecule are "diluted" by cocondensing saturated aliphatic or aromatic dicarboxylic acids. Straight-chain and branched diols are used as alcohol components. The individual UP resin types differ not only in the components used to prepare them but also in the proportion of saturated to unsaturated acids, which determines the degree of crosslinking in the polymerization, the degree of condensation, i.e., the molar mass, the acid number and OH number, i.e., the nature of the end groups in the chain molecules, the monomer content, and the nature of the additions (Ullmann's Encyclopedia of Industrial Chemistry, Vol. A21, p. 217 ff, 1992).

UP resins based on dicidol as the diol component are known from, for example, DE 924 889, DE 953 117, DE 22 45 110, DE 27 21 989, EP 0 114 208, and EP 0 934 988.

SUMMARY OF THE INVENTION

It is an object of the present invention to provide urethanized, unsaturated, and amorphous polyester resins which are water-dispersible and, in solid form, transparent. This and other objects have been achieved by the present invention the first embodiment of which includes an aqueous dispersion, comprising:
  a) an amorphous urethanized, unsaturated polyester resin,
  b) a nonvolatile content of from 20% to 60% by weight,
  c) from 0 to 60% by weight of a solvent,
  d) a pH of between 5.0 and 9.5, and
  e) a viscosity at 20° C. of from 20 to 500 mPas,
wherein said polyester resin is obtained from
I. an alcohol component,
II. i) from 20 to 100 mol % of an $\alpha,\beta$-unsaturated carboxylic acid component, and
  ii) from 0 to 80 mol % of a further carboxylic acid component, and
III. at least one isocyanate component,
  wherein the alcohol component comprises a dicidol mixture of the isomeric compounds 3,8-bis(hydroxymethyl) tricyclo[5.2.1.0$^{2,6}$]decane, 4,8-bis(hydroxymethyl)tricyclo [5.2.1.0$^{2,6}$]decane and 5,8-bis(hydroxymethyl)tricyclo [5.2.1.0$^{2,6}$]decane,
  wherein each isomer is present in a fraction of from 20 to 40% in the dicidol mixture,
  wherein the sum of the three isomers in the dicidol mixture is from 90 to 100%, and
  wherein the dicidol mixture is present from 10 to 100 mol % in the alcohol component of the polyester.

In another embodiment, the present invention includes a process for preparing an aqueous dispersion of an amorphous urethanized, unsaturated polyester resin, comprising:
  reacting an alcohol component I and an acid component II at a temperature of from 150 to 270° C., to obtain a product,
  urethanizing said product by reacting with an isocyanate component III, to obtain a polyester resin, and
  dispersing the polyester resin, following neutralization, into the aqueous phase, to obtain said dispersion;
  wherein said dispersion comprises
  a) said amorphous urethanized, unsaturated polyester resin,
  b) a nonvolatile content of from 20% to 60% by weight,
  c) from 0 to 60% by weight of a solvent,
  d) a pH of between 5.0 and 9.5, and
  e) a viscosity at 20° C. of from 20 to 500 mPas,
  wherein acid component of said polyester resin comprises
  i) from 20 to 100 mol % of an $\alpha,\beta$-unsaturated carboxylic acid component, and
  ii) from 0 to 80 mol % of a further carboxylic acid component,
  wherein the alcohol component comprises a dicidol mixture of the isomeric compounds 3,8-bis(hydroxymethyl) tricyclo[5.2.1.0$^{2,6}$]decane, 4,8-bis(hydroxymethyl)tricyclo [5.2.1.0$^{2,6}$]decane and 5,8-bis(hydroxymethyl)tricyclo [5.2.1.0$^{2,6}$]decane,
  wherein each isomer is present in a fraction of from 20 to 40% in the dicidol mixture,
  wherein the sum of the three isomers in the dicidol mixture is from 90 to 100%, and
  wherein the dicidol mixture is present from 10 to 100 mol % in the alcohol component of the polyester.

DETAILED DESCRIPTION OF THE INVENTION

The present invention provides aqueous dispersions of amorphous urethanized unsaturated polyester resins, the polyester resin being synthesized from
I. an alcohol component,
II. a) from 20 to 100 mol % of an $\alpha,\beta$-unsaturated carboxylic acid component, and
  b) from 0 to 80 mol % of a further carboxylic acid component,
III. at least one isocyanate component. The alcohol component contains a dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane. Each isomer may be present in a fraction of from 20 to 40% by weight in the dicidol mixture. The sum of the three isomers is from 90 to 100% by weight. The dicidol mixture is present at least from 10 to 100 mol % in the alcohol component of the polyester.

In addition, the aqueous dispersions have
a) a nonvolatiles content of from 20% to 60% by weight,
b) a solvent content of from 0 to 60% by weight,
c) a pH of between 5.0 and 9.5, and
d) a viscosity at 20° C. of from 20 to 500 mPas.

The amount of $\alpha,\beta$-unsaturated carboxylic acid component includes all values and subvalues therebetween, especially including 25, 30, 35, 40, 45, 50, 55, 60, 65, 70, 75, 80, 85, 90 and 95 mol %. The amount of further carboxylic acid includes all values and subvalues therebetween, especially including 5, 10, 15, 20, 25, 30, 35, 40, 45, 50, 55, 60, 65, 70 and 75 mol %. The amount of each isomer of the dicidol mixture includes all values and subvalues therebetween, especially including 25, 30 and 35% by weight. The sum of the three isomers of the dicidol mixture includes all values and subvalues therebetween, especially including 92, 94, 96 and 98% by weight. The amount of dicidol mixture in the alcohol component of the polyester includes all values and subvalues therebetween especially including 15, 20, 25, 30, 35, 40, 45, 50, 55, 60, 65, 70, 75, 80, 85, 90 and 95 mol %. The content of nonvolatiles includes all values and subvalues therebetween, especially including 25, 30, 35, 40, 45, 50 and 55% by weight. The content of solvent includes all values and subvalues therebetween, especially including 5, 10, 15, 20, 25, 30, 35, 40, 45, 50 and 55% by weight. The pH includes all values and subvalues therebetween, especially including 5.5, 6, 6.5, 7, 7.5, 8, 8.5 and 9. The viscosity includes all values and subvalues therebetween, especially including 50, 100, 150, 200, 250, 300, 350, 400 and 450-mPas According to the present invention, the dispersions of the amorphous urethanized unsaturated polyester resins are obtained by polycondensing the alcohol component and the acid components and then reacting the product with an isocyanate component and optionally a further polyol component followed by dispersing the product in water after neutralization.

The alcohol component comprises, in accordance with the present invention, a dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane. Each isomer may be present in a fraction of from 20 to 40% by weight in the isomeric mixture. The sum of the three isomers is from 90 to 100% by weight, preferably from 95 to 100% by weight, and the dicidol mixture is present at least at 10% by weight in the alcohol component of the polyester.

The isomer content of the dicidol mixture can be determined qualitatively and quantitatively by, for example, GC analysis or quantitatively by fractionation, by preparative GC or HPLC and subsequent NMR spectroscopy. All corresponding isomers of dicidol in position 9 are equally suitable but, due to the mirror symmetry of the above-mentioned isomers, and also of the cis and trans isomers, are impossible to distinguish under normal circumstances relevant to practice. The dicidol mixture may also contain up to 10% by weight of further isomers of dicidol and/or trimeric and/or higher isomeric diols of the Diels-Alder reaction product from cyclopentadiene. The alcohol contains preferably 20%, 30%, more preferably 60%, with particular preference of 100% by weight of dicidol mixture, which with particular preference contains from 95 to 100% of the three isomeric compounds stated above. The amount of further isomers includes all values and subvalues between 0 and 10%, especially including 2, 3, 4, 5, 6, 7, 8 and 9% by weight.

Besides the dicidol mixture, the alcohol component can contain not more than 90% by weight of further linear and/or branched, aliphatic and/or cycloaliphatic and/or aromatic diols and/or polyols. The amount of further linear and/or branched, aliphatic and/or cycloaliphatic and/or aromatic diols and/or polyols includes all values and subvalues therebetween, especially including 5, 10, 15, 20, 25, 30, 35, 40, 45, 50, 55, 60, 65, 70, 75, 80 and 85% by weight. Preferred additional alcohols used include ethylene glycol, 1,2- and/or 1,3-propanediol, diethylene glycol, dipropylene glycol, triethylene glycol, tetraethylene glycol, 1,2- and/or 1,4-butanediol, 1,3-butylethylpropanediol, 1,3-methylpropanediol, 1,5-pentanediol, bisphenol A, B, C or F, norbornylene glycol, 1,4-benzyldimethanol and 1,4-benzyldiethanol, 2,4-dimethyl-2-ethylhexane-1,3-diol, cyclohexanedimethanol, glycerol, hexanediol, neopentyl glycol, trimethylolethane, trimethylolpropane and/or pentaerythritol.

The amorphous urethanized unsaturated polyester resins of the present invention contain as starting acid component at least from 20 to 100 mol %, preferably from 50 to 100 mol %, more preferably from 80 to 100 mol % of an α,β-unsaturated dicarboxylic acid. Preference is given to using citraconic, fumaric, itaconic, maleic and/or mesaconic acid. Particular preference is given to using fumaric and/or maleic acid (anhydride).

In addition, it is also possible for aromatic and/or aliphatic and/or cycloaliphatic monocarboxylic acids and/or dicarboxylic acids and/or polycarboxylic acids to be present in amounts of up to 80 mol %, preferably up to 50 mol %, more preferably up to 20 mol %. The amount of aromatic and/or aliphatic and/or cycloaliphatic monocarboxylic acids and/or dicarboxylic acids and/or polycarboxylic acids includes all values and subvalues between 0 and 80 mol %, especially including 5, 10, 15, 20, 25, 30, 35, 40, 45, 50, 55, 60, 65, 70 and 75 mol %. Examples are phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, dodecanedioic acid, adipic acid, azelaic acid, pyromellitic acid and/or trimellitic acid, isononanoic acid, and 2-ethylhexanoic acid. Phthalic acid, hexahydrophthalic acid, tetra-hydrophthalic acid, hexahydroterephthalic acid, trimellitic acid, adipic acid and/or azelaic acid are preferred.

The acid component may contain in whole or in part anhydrides and/or low molecular mass alkyl esters, preferably methyl esters and/or ethyl esters.

Generally speaking the alcohol component is present at a molar ratio of from 0.5 to 2.0:1 with respect to the acid component, preferably from 0.8 to 1.5:1. The molar ratio of the alcohol component to the acid component includes all values and subvalues therebetween, especially including 0.6:1, 0.7:1, 0.8:1, 0.9:1, 1:1, 1.1:1, 1.2:1, 1.3:1, 1.4:1, 1.5:1, 1.6:1, 1.7:1, 1.8:1 and 1.9:1.

With particular preference the reaction of the alcohol component takes place in a molar ratio of from 1.0 to 1.3:1 with respect to the acid component.

The urethanization of the unsaturated amorphous polyester is effected by reacting the unsaturated amorphous polyester with an isocyanate component and optionally a further polyol component using from 0.2 to 1.5 mol of isocyanate component per mole of polyester. The amount of isocyanate per mole of polyester includes all values and subvalues therebetween, especially including 0.3, 0.4, 0.5, 0.6, 0.7, 0.8, 0.9, 1, 1.1, 1.2, 1.3 and 1.4 mol. Optionally, the urethanization is carried out in the presence of from 0.2 to 1.5 mol of further polyol component or subsequently thereto. The amount of further polyol includes all values and subvalues therebetween, especially including 0.3, 0.4, 0.5, 0.6, 0.7, 0.8, 0.9, 1, 1.1, 1.2, 1.3 and 1.4 mol.

Isocyanates which are preferably used as an isocyanate component are aliphatic and/or cycloaliphatic polyisocyanates having an average molecular weight of up to about 1000 g/mol and an average isocyanate functionality from 2 to 4. These include, for example, simple diisocyanates such as 1,6-diisocyanatohexane (HDI), bis(4-isocyanatocyclohexyl) methane (HMDI), 1,5-diisocyanato-2-methylpentane (MPDI), 1,6-diisocyanato-2,4,4-trimethylhexane (TMDI) and also in particular 3-isocyanatomethyl-3,5,5-trimethyl-cyclohexyl isocyanate (IPDI) and/or their mixtures. It is further possible to use polyisocyanates which are obtainable by reaction with bifunctional reactants (for example diols, diamines, dihydroxycarboxylic acids, etc.). Another preferred class of polyisocyanates is that of compounds which have been prepared by trimerization, allophanatization, biuretization and/or urethanization of simple diisocyanates and which have more than two isocyanate groups per molecule, for example, the reaction product of these simple diisocyanates, such as for example IPDI, HDI and/or HMDI, with polyhydric alcohols (e.g. glycerol, trimethylolpropane, pentaerythritol) or polyfunctional polyamines or the triisocyanurates which are obtainable by trimerization of simple diisocyanates, such as for example IPDI, HDI and HMDI. Useful representatives of aromatic polyisocyanates include for example tetra-methylenexylylene diisocyanate (TMXDI), 2,4-diisocyanatotoluene and/or its technical mixtures with 2,6-diisocyanatotoluene and also 4,4'-diisocyanatodiphenylmethane and/or its mixtures with 2,4'-diisocyanatodiphenylmethane.

As additional polyol component it is possible to use mono- and polyhydroxyalkylcarboxylic acids as described in U.S. Pat. No. 3,412,054, preferably 2,2-dimethylolacetic acid, 2,2-dimethylolpropionic acid, 2,2-dimethylolbutyric acid, 2,2-dimethylolpentanoic acid, dihydroxysuccinic acid, 1,1,1-trimethylolacetic acid, hydroxypivalic acid or mixtures thereof. Also suitable are mono- and poly-hydroxysulfonic acids and mono- or polyhydroxyphosphonic acids, such as 2,3-dihydroxypropanephosphonic acid.

The urethanized unsaturated amorphous polyester resins of the present invention have an acid number of between 1 and 200 mg KOH/g, preferably between 1 and 100, more preferably between 10 and 50 mg KOH/g, and an OH number of between 1 and 200 mg KOH/g, preferably between 1 and 100, more preferably between 10 and 80 mg KOH/g. The acid number includes all values and subvalues therebetween, especially including 10, 20, 30, 40, 50, 60, 70, 80, 90, 100, 110, 120, 130, 140, 150, 160, 170, 180 and 190 mg KOH/g. The OH number includes all values and subvalues therebetween, especially including 10, 20, 30, 40, 50, 60, 70, 80, 90, 100, 110, 120, 130, 140, 150, 160, 170, 180 and 190 mg KOH/g.

The Tg of the unsaturated amorphous polyesters of the present invention varies from −30 to +80° C., preferably from −20 to +50° C., more preferably from −10 to +40° C. The Tg includes all values and subvalues therebetween, especially including −20, −10, 0, 10, 20, 30, 40, 50, 60 and 70° C.

In one preferred embodiment A, the amorphous urethanized unsaturated polyester resins of the present invention contain an alcohol component containing at least 80%, 90%, preferably 95%, more preferably 100% of the dicidol mixture of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane and of fumaric acid and/or maleic acid (anhydride), isophorone diisocyanate and/or hexamethylene diisocyanate (HDI) and 2,2-dimethylolpropionic acid.

In a further preferred embodiment B, the polyester resins comprise the above-mentioned starting components as under A and additionally a further acid component selected from adipic acid or phthalic acid (anhydride), it being possible for the ratio of the α,β-unsaturated acid to the additional acid to vary from 3:1 to 1:4. Preference is given to ratios of approximately from 1:1 to 1:2. The polyesters generally have acid numbers of from 1 to 200, preferably from 1 to 100, more preferably from 10 to 50 mg KOH/g and OH numbers of from 1 to 200, preferably from 1 to 100, more preferably from 10 to 80 mg KOH/g.

The dispersions of amorphous urethanized unsaturated polyester resins, according to the present invention, can also comprise auxiliaries and additives selected from inhibitors, solvents, neutralizing agents, surfactants, oxygen scavengers and/or free-radical scavengers, catalysts, light stabilizers, colour brighteners, photosensitizers, thixotropic agents, antiskinning agents, defoamers, antistats, thickeners, thermoplastic additives, dyes, pigments, flame retardants, internal release agents, fillers and/or blowing agents.

The present invention also provides a process for preparing the above aqueous dispersions of amorphous urethanized unsaturated polyester resins by reacting starting components I (alcohol component) and II (α,β-unsaturated carboxylic acid component and optionally further carboxylic acid component), at a temperature of from 150 to 270° C. The resulting product is subsequently urethanized by reacting the product with the isocyanate component III. The resulting polyester resin is dispersed, following neutralization, into the aqueous phase. The reaction temperature includes all values and subvalues therebetween, especially including 160, 170, 180, 190, 200, 210, 220, 230, 240, 250 and 260° C.

The polyester resins of the present invention are prepared by (semi)continuous or batchwise esterification of the starting acids II and starting alcohols I in a single-stage or multistage procedure, subsequent urethanization of said polyester by adding a suitable polyisocyanate and/or diisocyanate optionally the further polyol component, and subsequent dispersion in water.

The reaction of I and II for the preparation of the unsaturated amorphous polyesters, as described above, is conducted preferably in an inert gas atmosphere at from 150 to 270° C., more preferably from 160 to 230° C., very preferably from 160 to 210° C. Nitrogen or noble gases, especially nitrogen, can be used as inert gas. The inert gas has an oxygen content of less than 50 ppm, in particular less than 20 ppm. The oxygen content of the inert gas includes all values and subvalues between 0 and 50 ppm, especially including 5, 10, 15, 20, 25, 30, 35, 40 and 45 ppm.

The process for urethanizing the unsaturated amorphous polyesters as described above is carried out where appropriate using a suitable auxiliary solvent at preferred temperatures of below 100° C. and more preferably of below 70° C., most preferably below 50° C. Suitable auxiliary solvents used are low-boiling inert solvents which have no miscibility gap with water, at least over wide ranges, which possess a boiling point under atmospheric pressure of below 100° C. and which can therefore easily be separated off, if desired, by distillation down to a residual level of less than 2% by weight, and in particular of less than 0.5% by weight, based on the finished dispersion, and can be used again. Preferred solvents of this kind include acetone, methyl ethyl ketone, and tetrahydrofuran. Also suitable are higher-boiling solvents such as n-butyl glycol, di-n-butyl glycol, and N-methylpyrrolidone, for example, which then remain in the water-dilutable dispersion.

The polyester resins of the present invention are fully or partly neutralized with a suitable neutralizing agent, such as an amine, for example, or an inorganic hydroxide solution, preference being given to ammonia, dimethylethanolamine, triethylamine and/or NaOH. The degree of neutralization is between 0.3 and 1.2, preferably between 0.4 and 1.1, more preferably between 0.6 and 1.05, and the product is a water-dilutable, amorphous, urethanized unsaturated polyester. This polyester is, as described above, dispersed in water with the use where appropriate of up to 60% by weight of a suitable auxiliary solvent. Depending on the intended use of the dispersion, the auxiliary solvent used can be removed finally by distillation from the resulting dispersion.

Having generally described this invention, a further understanding can be obtained by reference to certain specific examples which are provided herein for purposes of illustration only, and are not intended to be limiting unless otherwise specified.

The aqueous dispersions of the amorphous urethanized unsaturated polyesters, according to the present invention, are illustrated by the following examples:

EXAMPLES

Starting component dicidol mixture has an approximately 1:1:1 isomer ratio.

Example 1

Urethanized Polyester I 1.25 mol of adipic acid were reacted with 3.675 mol of dicidol at max. 210° C. under a nitrogen atmosphere until an acid number of less than 5 mg KOH/g was reached. Then 1.25 mol of fumaric acid and 0.05% by weight of hydroquinone monomethyl ether (based on fumaric acid) were added. After 2 hours of stirring a vacuum of 20 mbar was applied until an acid number below 5 mg KOH/g was reached. After cooling, the polyester was dissolved in acetone to give a 60% strength solution.

1 128 g of this polyester solution were reacted with 431.9 g of an adduct consisting of two moles of isophorone diisocyanate and one mole of dimethylolpropionic acid (60% solution in acetone) in the presence of 1.0 g of dibutyltin dilaurate at reflux temperature over 14 h until an NCO content of less than 0.1% was reached.

Characteristics:

Acid number: 26.6 mg KOH/g, solids content: 63.5%.

Preparation of an Aqueous Dispersion I

The above-described urethanized polyester I was diluted with acetone to a solids content of 50% and admixed with DMAE to a degree of neutralization of 1.05. Desalinated water is added with pronounced stirring and after a further 30 min the acetone is distilled off under slightly reduced pressure. This gives a storage-stable solvent-free dispersion having a solids content of about 27%.

Characteristics:

Viscosity$_{D=200}$: 320 mPas, pH: 8.8, solids content: 27.3%.

Example 2

Urethanized Polyester II 1.25 mol of adipic acid were reacted with 3.675 mol of dicidol at max. 210° C. under a nitrogen atmosphere until an acid number of less than 5 mg KOH/g was reached. Then 1.25 mol of fumaric acid and 0.05% by weight of hydroquinone monomethyl ether (based on fumaric acid) were added. After 2 hours of stirring a vacuum of 20 mbar was applied until an acid number below 5 mg KOH/g was reached. After cooling, the polyester was dissolved in acetone to give a 60% strength solution.

1 129 g of this polyester solution were reacted with 431.9 g of an adduct consisting of two moles of isophorone diisocyanate and one mole of dimethylolpropionic acid (60% solution in acetone) in the presence of 1.0 g of dibutyltin dilaurate at reflux temperature over 14 h until an NCO content of less than 0.1% was reached.

Characteristics:

Acid number: 23.1 mg KOH/g, solids content: 60.8%.

Preparation of an Aqueous Dispersion I

The above-described urethanized polyester II was diluted with acetone to a solids content of 50% and admixed with DMAE to a degree of neutralization of 1.00. Desalinated water was added with pronounced stirring and after a further 30 min the acetone was distilled off under slightly reduced pressure. This gave a storage-stable solvent-free dispersion having a solids content of 27%.

Characteristics:

Viscosity$_{D=200}$: 370 mPas, pH: 8.5, solids content: 27.3%.

German patent application 10261005.3 filed Dec. 24, 2003, is incorporated herein by reference.

Numerous modifications and variations on the present invention are possible in light of the above teachings. It is therefore to be understood that within the scope of the appended claims, the present invention may be practiced otherwise than as specifically described herein.

The invention claimed is:

1. An aqueous dispersion, comprising:
   a) an amorphous urethanized, unsaturated polyester resin,
   b) a nonvolatile content of from 20% to 60% by weight,
   c) from 0 to 60% by weight of a solvent,
   d) a pH of between 5.0 and 9.5, and
   e) a viscosity at 20° C. of from 20 to 500 mPas,
   wherein said polyester resin is obtained from
   I. an alcohol component,
   II. i) from 20 to 100 mol % of an α,β-unsaturated carboxylic acid component, and
      ii) from 0 to 80 mol % of a further carboxylic acid component, and
   III. at least one isocyanate component,
   wherein the alcohol component comprises a dicidol mixture of the isomeric compounds 3,8-bis(hydroxymethyl)tricyclo[5.2.1.0$^{2,6}$]decane, 4,8-bis(hydroxymethyl)-tricyclo[5.2.1.0$^{2,6}$]decane and 5,8-bis(hydroxymethyl)tricyclo[5.2.1.0$^{2,6}$]decane,
   wherein each isomer is present in a fraction of from 20 to 40% by weight in the dicidol mixture,
   wherein the sum of the three isomers in the dicidol mixture is from 90 to 100% by weight, and
   wherein the dicidol mixture is present from 10 to 100 mol % in the alcohol component of the polyester.

2. The aqueous dispersion as claimed in claim 1, wherein the alcohol component further comprises up to 10% by weight of additional isomers of dicidol, trimeric isomeric diols of the Diels-Alder reaction product of cyclopentadiene, higher isomeric diols of the Diels-Alder reaction product of cyclopentadiene or mixtures thereof.

3. The aqueous dispersion as claimed in claim 1, wherein at least 20 mol % of the alcohol component comprises dicidol.

4. The aqueous dispersion as claimed in claim 1, wherein at least 30 mol % of the alcohol component comprises dicidol.

5. The aqueous dispersion as claimed in claim 1, wherein at least 60 mol % of the alcohol component comprises dicidol.

6. The aqueous dispersion as claimed in claim 1, wherein at least 100 mol % of the alcohol component comprises dicidol.

7. The aqueous dispersion as claimed in claim 1, wherein the alcohol component further comprises not more than 90 mol % of at least one member selected from the group consisting of linear diols, branched diols, aliphatic diols, cycloaliphatic diols, aromatic diols, linear polyols, branched polyols, aliphatic polyols, cycloaliphatic polyols, aromatic polyols and mixtures thereof.

8. The aqueous dispersion as claimed in claim 1, wherein the alcohol component further comprises a compound selected from the group consisting of ethylene glycol, 1,2-propanediol, 1,3-propanediol, diethylene, dipropylene, triethylene glycol, tetraethylene glycol, 1,2-butanediol, 1,4-butanediol, 1,3-butylethylpropanediol, 1,3-methylpropanediol, 1,5-pentanediol, cyclohexanedimethanol, glycerol, hexanediol, neopentylglycol, trimethylolethane, trimethyloipropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethylhexane-1,3-diol, and mixtures thereof.

9. The aqueous dispersion as claimed in claim 1, wherein the α,β-unsaturated acid component comprises at least one compound selected from the group consisting of citraconic acid, fumaric acid, itaconic acid, maleic acid, mesaconic acid and mixtures thereof.

10. The aqueous dispersion as claimed in claim 1, wherein the α,β-unsaturated acid component comprises at least one compound selected from the group consisting of fumaric acid, maleic acid, fumaric acid anhydride, maleic acid anhydride and mixtures thereof.

11. The aqueous dispersion as claimed in claim 1, wherein the further acid component comprises at least one compound selected from the group consisting of aromatic monocarboxylic acids, aliphatic monocarboxylic acids, cycloaliphatic monocarboxylic acids, aromatic dicarboxylic acids, aliphatic dicarboxylic acids, cycloaliphatic dicarboxylic acids, aromatic polycarboxylic acids, aliphatic polycarboxylic acids, cycloaliphatic polycarboxylic acids and mixtures thereof.

12. The aqueous dispersion as claimed in claim 11, wherein the further acid component comprises at least one member selected from the group consisting of phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, dodecanedioic acid, adipic acid, azelaic acid, pyromellitic acid, trimellitic acid, anhydride of phthalic acid, anhydride of isophthalic acid, anhydride of terephthalic acid, anhydride of 1,4-cyclohexanedicarboxylic acid, anhydride of succinic acid, anhydride of sebacic acid, anhydride of methyltetrahydrophthalic acid, anhydride of methylhexahydrophthalic acid, anhydride of hexahydrophthalic acid, anhydride of tetrahydrophthalic acid, anhydride of dodecanedioic acid, anhydride of adipic acid, anhydride of azelaic acid, anhydride of pyromellitic acid, anhydride of trimellitic acid, methylesters of phthalic acid, methylesters of isophthalic acid, methylesters of terephthalic acid, methylesters of 1,4-cyclohexanedicarboxylic acid, methylesters of succinic acid, methylesters of sebacic acid, methylesters of methyltetrahydrophthalic acid, methylesters of. methylhexahydrophthalic acid, methylesters of hexahydrophthalic acid, methylesters of tetrahydrophthalic acid, methylesters of dodecanedioic acid, methylesters of adipic acid, methylesters of azelaic acid, methylesters of pyromellitic acid, methylesters of trimellitic acid, isononanoic acid, 2-ethylhexanoic acid and mixtures thereof.

13. The aqueous dispersion as claimed in claim 12, wherein the further acid component comprises at least one member selected from the group consisting of adipic acid, phthalic acid, adipic acid anhydride, phthalic acid anhydride and mixtures thereof.

14. The aqueous dispersion as claimed in claim 1, wherein the acid component comprises in whole or in part at least one member selected form the group consisting of anhydrides, alkyl esters and mixtures thereof.

15. The aqueous dispersion as claimed in claim 1, comprising the alcohol component of the polyester resin in a molar ratio of from 0.5 to 2.0:1 with respect to the acid component.

16. The aqueous dispersion as claimed in claim 1, comprising the alcohol component of the polyester resin in a molar ratio of from 0.8 to 1.5:1 with respect to the acid component.

17. The aqueous dispersion as claimed in claim 1, comprising the alcohol component of the polyester resin in a molar ratio of from 1.0 to 1.3:1 with respect to the acid component.

18. The aqueous dispersion as claimed in claim 1, wherein the polyester resin has an acid number of between 1 and 200 mg KOH/g.

19. The aqueous dispersion as claimed in claim 1, wherein the polyester resin has an OH number of between 1 and 200 mg KOH/g.

20. The aqueous dispersion as claimed in claim 1, wherein said isocyanate component comprises a polyisocyanate, a diisocyanate or mixtures thereof.

21. The aqueous dispersion as claimed in claim 20, wherein the amorphous unsaturated polyester additionally contains a further polyol component for urethanization.

22. The aqueous dispersion as claimed in claim 1, wherein said isocyanate is an aromatic diisocyanate, an aliphatic diisocyanate, a cycloaliphatic diisocyanate or mixtures thereof.

23. The aqueous dispersion as claimed in claim 1, wherein said isocyanate is at least one member selected from the group consisting of isophorone diisocyanate, hexamethylene diisocyanate, 4,4'-methylenebis(cyclohexyl diisocyanate) and mixtures thereof.

24. The aqueous dispersion as claimed in claim 21, wherein the further polyol component is a bishydroxyalkylcarboxylic acid.

25. The aqueous dispersion as claimed in claim 1, further comprising auxiliaries and additives.

26. The aqueous dispersion as claimed in claim 1, further comprising auxiliaries and additives selected from the group consisting of inhibitors, neutralizing agents, surfactants, oxygen scavengers, free-radical scavengers, catalysts, light stabilizers, color brighteners, photosensitizers, thixotropic agents, antiskinning agents, defoamers, antistats, thickeners, thermoplastic additives, dyes, pigments, flame retardants, internal release agents, fillers, blowing agents and mixtures thereof.

27. The aqueous dispersion as claimed in claim 1, wherein the alcohol component of the unsaturated amorphous polyester resin comprises at least 80% dicidol mixture, and wherein the acid component comprises at least one component selected from the group consisting of fumaric acid, maleic acid, fumaric acid anhydride, maleic acid anhydride and mixtures thereof.

28. The aqueous dispersion as claimed in claim 1, wherein the amorphous urethanized, unsaturated polyester resin further comprises at least one unit selected from the group consisting of adipic acid, phthalic acid, adipic acid anhydride, phthalic acid anhydride and mixtures thereof as acid component, in a ratio of $\alpha,\beta$-unsaturated acid to additional acid of from 3:1 to 1:4.

29. The aqueous dispersion as claimed in claim 1, wherein at least a part of the acid groups of the urethanized, unsaturated amorphous polyester resin have been neutralized.

30. The aqueous dispersion as claimed in claim 1, wherein at least one member selected from the group consisting of an amine, an inorganic hydroxide solution and mixtures thereof is used for the neutralization.

31. The aqueous dispersion as claimed in claim 1, wherein the degree of neutralization is between 0.3 and 1.2.

32. A process for preparing an aqueous dispersion of an amorphous urethanized, unsaturated polyester resin, comprising:
   reacting an alcohol component I and an acid component II at a temperature of from 150 to 270° C., to obtain a product,
   urethanizing said product by reacting with an isocyanate component III, to obtain a polyester resin, and
   dispersing the polyester resin, following neutralization, into the aqueous phase, to obtain said dispersion;
   wherein said dispersion comprises
      a) said amorphous urethanized, unsaturated polyester resin,
      b) a nonvolatile content of from 20% to 60% by weight,
      c) from 0 to 60% by weight of a solvent,
      d) a pH of between 5.0 and 9.5, and
      e) a viscosity at 20° C. of from 20 to 500 mPas,
   wherein acid component of said polyester resin comprises
      i) from 20 to 100 mol % of an $\alpha,\beta$-unsaturated carboxylic acid component, and
      ii) from 0 to 80 mol % of a further carboxylic acid component,
   wherein the alcohol component comprises a dicidol mixture of the isomeric compounds 3,8-bis(hydroxymethyl)tricyclo[$5.2.1.0^{2,6}$]decane, 4,8-bis(hydroxymethyl)-tricyclo[$5.2.1.0^{2,6}$]decane and 5,8-bis(hydroxymethyl)tricyclo[$5.2.1.0^{2,6}$]decane,
   wherein each isomer is present in a fraction of from 20 to 40% by weight in the dicidol mixture,
   wherein the sum of the three isomers in the dicidol mixture is from 90 to 100% by weight, and
   wherein the dicidol mixture is present from 10 to 100 mol % in the alcohol component of the polyester.

33. The process as claimed in claim 32, wherein the reaction of components I and II takes place at a temperature of from 160 to 230° C.

34. The process as claimed in claim 32, wherein the reaction takes place in an inert gas atmosphere.

35. The process as claimed in claim 32, wherein the inert gas has an oxygen content of less than 50 ppm.

36. The process as claimed in claim 32, wherein the amorphous urethanized, unsaturated polyester resin is dispersed in water using an organic auxiliary solvent.

37. The process as claimed in claim 36, wherein the organic auxiliary solvent is removed by distillation.

* * * * *